(No Model.)

T. McSWEENEY.
COMPOSITION PIPE.

No. 372,631.  Patented Nov. 1, 1887.

WITNESSES:
R. H. Whittlesey
F. E. Gaither

INVENTOR,
Terence Mc. Sweeney
by Darwin S. Wolcott
Att'y.

UNITED STATES PATENT OFFICE.

TERRENCE McSWEENEY, OF ALLEGHENY, ASSIGNOR OF ONE-HALF TO THOMAS A. GILLESPIE, OF PITTSBURG, PENNSYLVANIA.

COMPOSITION PIPE.

SPECIFICATION forming part of Letters Patent No. 372,631, dated November 1, 1887.

Application filed April 13, 1887. Serial No. 234,587. (No model.)

*To all whom it may concern:*

Be it known that I, TERRENCE MCSWEENEY, residing at Allegheny, in the county of Allegheny and State of Pennsylvania, a citizen of the United States, have invented or discovered certain new and useful Improvements in Composition Pipes, of which improvements the following is a specification.

Figure 1:
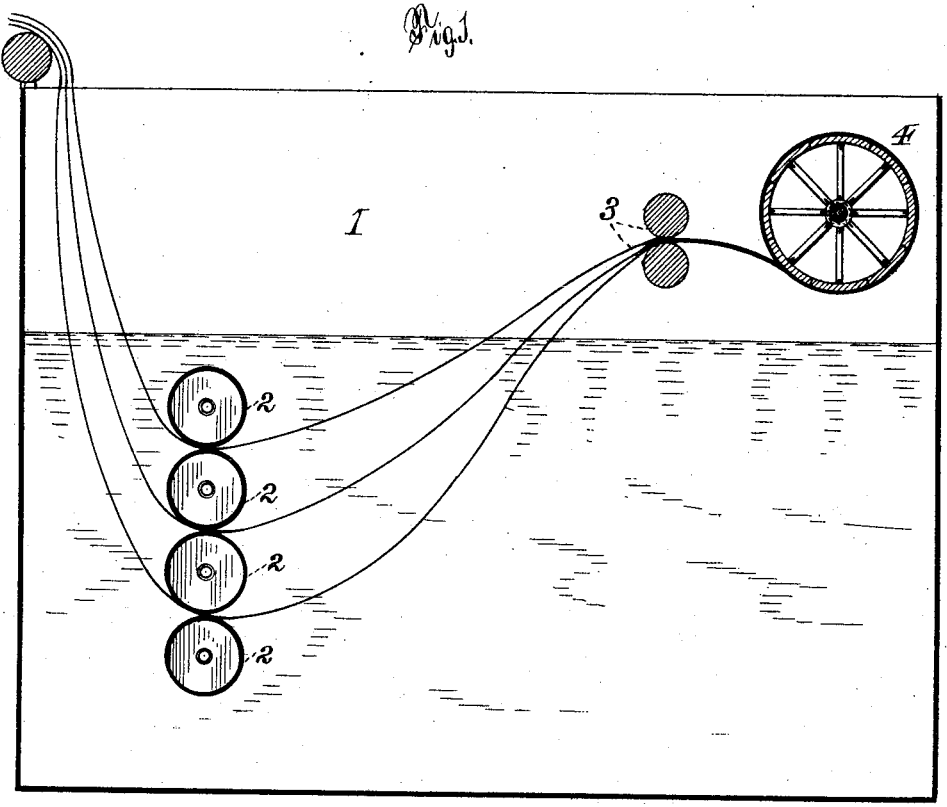
Figure 2:
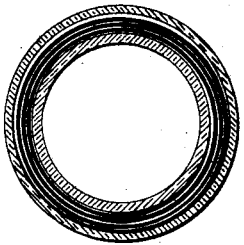

In the accompanying drawings, which make part of this specification, Figure 1 is a sectional elevation of one form of apparatus employed in the practice of my invention. Fig. 2 is a sectional view of a pipe formed in accordance with my invention.

The invention herein relates to certain improvements in the manufacture of paper pipes, conduits, and other structural shapes, and has for its object such a construction and combination of elements or parts as will form a light strong pipe, conduit, or other structural shape having a hard, dense, and comparatively-rigid body.

In general terms, the invention consists in the construction and composition of parts and elements, all as more fully hereinafter described and claimed.

In the practice of my invention I prepare a composition consisting of asphaltum, rosin, coal-tar, and pulverized glass or sand mixed in about the proportions of sixty pounds of asphaltum, twenty pounds of rosin, and twenty pounds of coal-tar melted and stirred together. To this mixture is added pulverized glass or sand in such amounts as will render the mixture comparatively hard and rigid when cold, but will not render it stiff and pasty while hot. This mixture is placed in a tank, 1, of any suitable construction that will permit of the maintenance of the mixture in a heated or fluid condition. In the sides of the tank are journaled the hollow rolls 2, between which sheets of paper, or paper and cloth, are passed, in order that each sheet may be thoroughly coated and impregnated with the mixture. These rolls, as shown, are located below the surface of the mixture, and are made hollow for the reception of gas-jets, in order that the rolls may be kept hot to prevent the adherence of the mixture thereto. From the rolls 2 the sheets pass up through the mixture between compressing-rolls 3, journaled in the sides of the tank above the surface of the mixture and adapted to compress the sheets together and remove all surplus of the mixture to the mandrel 4. The sheets thus pressed together are wound around the mandrel until the desired thickness has been obtained. The sheets are then cut, the wrapped mandrel removed, another substituted therefor, and the process continued. When the sheets on the mandrel have been cooled and the mixture hardened, the mandrel is contracted and removed. In case the pipe or conduit is to be subjected to considerable internal strain, cloth is substituted for one of the paper sheets, preferably the middle one.

It is desirable in some cases that the pipe, conduit, or other structural shape should have a smooth polished surface, and in such cases the surfaces of the articles are coated with an enamel consisting of rosin, plaster-of-paris, and finely-pulverized glass or sand. This enamel is prepared by melting the rosin and adding the plaster-of-paris, glass, or sand in such quantities as will impart a body to the mixture without destroying its fluidity. This enamel is applied to the surfaces of the article while hot by a brush, sponge, or in any other suitable manner, and allowed to harden. Any suitable coloring-matter may be added to the enamel, which when cold has a hard, smooth, and polished surface. These pipe-sections may be formed in any suitable lengths and united by a sleeve formed in the same manner as the pipe-sections, slipped over the adjacent ends of pipe-sections, and secured thereto by the mixture with which the sheets of paper are coated and impregnated.

In using pipes constructed as above described for laying underground electric wires the sections are cut longitudinally, the wires laid in position, the space filled with the above-described mixture, which is a non-conductor, the cut edges of the pipe drawn together by a clamp or otherwise, and cemented together by the above-described mixture, thus hermetically sealing the wires in place.

The surface-coating, consisting of rosin, plaster-of-paris, and pulverized glass or sand, is not claimed herein *per se*, but is reserved as the subject-matter of another application for Letters Patent.

I claim herein as my invention—

1. As a new article of manufacture, a pipe or conduit consisting of layers of paper, or paper and cloth, cemented together with a mixture of asphaltum, rosin, coal-tar, and pulverized glass or sand, substantially as set forth.

2. As a new article of manufacture, a pipe or conduit consisting of layers of paper, or paper and cloth, cemented together with a mixture of asphaltum, rosin, coal-tar, and pulverized glass or sand, and surfaced with a mixture of rosin, plaster-of-paris, and pulverized glass or sand, substantially as set forth.

In testimony whereof I have hereunto set my hand.

TERRENCE McSWEENEY.

Witnesses:
R. H. WHITTLESEY,
DARWIN S. WOLCOTT.